US009465504B1

(12) United States Patent
Jurgens et al.

(10) Patent No.: US 9,465,504 B1
(45) Date of Patent: Oct. 11, 2016

(54) AUTOMATED COLLABORATIVE BEHAVIOR ANALYSIS USING TEMPORAL MOTIFS

(71) Applicant: HRL Laboratories, LLC, Malibu, CA (US)

(72) Inventors: David A. Jurgens, Rome (IT); Tsai-Ching Lu, Wynnewood, PA (US)

(73) Assignee: HRL Laboratories, LLC, Malibu, CA (US)

( * ) Notice: Subject to any disclaimer, the term of this patent is extended or adjusted under 35 U.S.C. 154(b) by 568 days.

(21) Appl. No.: 13/888,178

(22) Filed: May 6, 2013

(51) Int. Cl.
G06N 5/00 (2006.01)
G06F 1/00 (2006.01)
G06F 3/048 (2013.01)

(52) U.S. Cl.
CPC ..................................... *G06F 3/048* (2013.01)

(58) Field of Classification Search
CPC .......... G06N 5/04; G06N 5/02; G06N 5/022; G06Q 50/01
See application file for complete search history.

(56) References Cited

U.S. PATENT DOCUMENTS

2010/0030578 A1* 2/2010 Siddique et al. .................. 705/3
2014/0258970 A1* 9/2014 Brown et al. .................. 717/103

OTHER PUBLICATIONS

Brandes, U., and Lerner, J. 2008. Visual analysis of controversy in user-generated encyclopedias. Information Visualization 7(1):34-48.
Brandes, U.; Kenis, P.; Lerner, J.; and Van Raaij, D. 2009. Network analysis of collaboration structure in wikipedia. In Proceedings of the 18th international conference on World Wide Web (WWW), 731-740, ACM.
Kittur, A.; Suh, B.; Pendleton, B.; and Chi, E. 2007. He says, she says: Conflict and coordination in wikipedia. In Proceedings of the SIGCHI conference on Human factors in computing systems, 453-462. ACM.
Kovanen, L.; Karsai, M.; Kaski, K.; Kertsz. J.; and Saramki, J. 2011. Temporal motifs in time-dependent networks. Journal of Statistical Mechanics: Theory and Experiment, 11:P11005.
Laniado, D., and Tasso, R. 2011. Co-authorship 2.0: Patterns of collaboration in wikipedia. In Proceedings of the 22nd ACM conference on Hypertext and hypermedia, 201-210. ACM.
Laniado, D.; Tasso, R.; Volkovich, Y.; and Kaltenbrunner, A. 2011. When the wikipedians talk: network and tree structure of wikipedia discussion pages. Proceedings of ICWSM.
Roth, C.; Taraborelli, D.; and Gilbert, N. 2008. Measuring wiki viability: An empirical assessment of the social dynamics of a large sample of wikis. In Proceedings of the 4th International Symposium on Wikis, 27. ACM.

(Continued)

*Primary Examiner* — Stanley K Hill
*Assistant Examiner* — Kalpana Bharadwaj
(74) *Attorney, Agent, or Firm* — Tope-McKay & Associates

(57) ABSTRACT

Described is a system for automated collaborative behavior analysis using temporal motifs. The system receives an input documents and change log files of a collaborative media, where the documents are continuously edited by multiple authors and where edits are recorded in the change log files, such as Wikipedia. A type of editing behavior by the authors of a given document is identified, and the edits made to the document are analyzed. The system reports how the authors interacted in a collaboration process, resulting in a set of reported author interactions. From the set of reported author interactions, a set of author interactions that are most and least significant in the collaboration process are identified. Then, based on the set of identified author interactions, future effects on documents of the collaborative media are estimated.

15 Claims, 9 Drawing Sheets

(56) References Cited

OTHER PUBLICATIONS

Sumi, R.: Yasseri, T.; Rung, A.; Komai, A.; and Kertesz, J. 2011. Edit wars in wikipedia. Arxiv preprint arXiv:1107.3689.

Wu, G.; Harrigan, M.; and Cunningham, P. 2011. A characterization of wikipedia content based on motifs in the edit graph. (UCD-CSI-2011-02).

Suh, B.; Convertino, G.; Chi, E.; and Pirolli, P. 2009. The singularity is not near: slowing growth of wikipedia. In Proceedings of the 5th International Symposium on Wikis and Open Collaboration, 8. ACM.

Newman, M. 2005. Power laws, pareto distributions and zipf's law. Contemporary physics 46(5):323-351.

Milo, R.; Shen-Orr, S.; Itzkovitz, S.; Kashtan, N.; Chklovskii, D.; and Alon, U. 2002. Network motifs: simple building blocks of complex networks. Science 298(5594):824.

Blei, D.; Ng, A.; and Jordan, M. 2003. Latent dirichlet allocation. The Journal of Machine Learning Research 3:993-1022.

Casella, George: George, Edward I. 1992. Explaimning the Gibbs samplet. The American Statistician, 46 (3): 167-174.

D. Jurgens, T.-C. Lu, Temporal Motifs Reveal the Dynamics of Editor Interactions in Wikipedia, International AAAI Conference on Weblogs and Social Media Sixth International AAAI Conference on Weblogs and Social Media, 2012.

\* cited by examiner

AUTOMATED COLLABORATIVE BEHAVIOR ANALYSIS USING TEMPORAL MOTIFS

BACKGROUND OF THE INVENTION (1) Field of Invention

The present invention relates to a system for automated classification of user behavior and interactions in collaborative media and, more particularly, to a system for automated classification of user behavior and interactions in collaborative media using temporal motifs.

(2) Description of Related Art

The open access policy of collaborative media, an example of which includes the online encyclopedia Wikipedia, has made it possible for users to modify the collaborative media through creating, editing, and deleting existing content, or adding and removing pages altogether. While early speculation suggested that this open access model was unsustainable, Wikipedia has continued to grow and improve in quality. Underlying this growth are the collaborative, and sometimes combative, interactions between editors working on the same content. Understanding the effects of different kinds of interactions enables one to predict future growth patterns in Wikipedia, as well as to assess the different characteristics of editors, page collaboration levels, and the interactions themselves.

Much of the current analysis of Wikipedia's authors interaction has focused on high-level characteristics such as the number of inter-editor reverts (see the List of Cited Literature References, Literature Reference No. 3) or interactions on talk pages (see Literature Reference No. 6). Recent studies have begun assessing the impact of specific editing behavior by looking at how editors revise each other's work (see Literature Reference Nos. 2 and 5). However, the focus has been on identifying contentious behavior between editors, and, accordingly, almost all models are limited in their ability to represent and analyze productive, collaborative behaviors.

For instance, Wu, Harrigan, and Cunningham (see Literature Reference No. 9) analyzed a static graph consisting of author-page and page-page edges for a small subset of Wikipedia's pages in order to discover motifs that correspond to author editing behavior. Their analysis was limited to discovering patterns for authors interacting with different pages.

Laniado et al. (see Literature Reference No. 6) analyzed a graph of editor interactions on author talk pages for assessing collaboration. They built the graph from discussion chains where authors reply to each other's comments on the talk page, and then analyzed the structure of the graph to discover patterns in editor interactions. A major disadvantage of this approach is that the majority of Wikipedia articles do not have a significant talk page to analyze, thereby preventing a full analysis of the collaboration. Furthermore, many authors do not participate on the talk pages, leaving out much on-page interaction.

Laniado and Tasso (see Literature Reference No. 5) built a co-authorship network from authors' interactions on the same page in order to identify high quality editors on the basis of network properties. They applied a series of network measures (centrality, clustering coefficients, and assortativity) to analyze how editors work together. Furthermore, they removed bots, administrators, and highly productive users for some experiments and used simple statistics that capture macroscopic properties of collaboration rather than specific editing behavior.

Additionally, Roth, Taborelli, and Gilbert (see Literature Reference No. 7) assessed the impact on Wikipedia's growth with respect to anonymous, regular, and administrative user types by tracking the density of users relative to the page's quality. They performed an edit-frequency analysis to determine the impact of editor density relative to editor type (e.g., anonymous, editor, and administrator), showing different quality implications for different distributions. However, this work does not assess the interactions of the editors on the page, only the frequency and density. Therefore, the approach is limited in its ability to capture the collaborative and combative interactions.

Furthermore, Brandes and Lerner (see Literature Reference No. 1) built a co-author network for all authors editing the same page, using reverts and inter-editor revisions to identify collaborative and contentious behavior. Brandes et al. (see Literature Reference No. 2) extended this work by identifying structural network properties that are correlated with the quality of Wikipedia articles. The edges in the network were labeled with how the authors have interacted. Then, a partitioning algorithm was used to break a page's editor-interaction network into groups based on mutually conflicting edges (i.e., two editors deleting each other's text). This work builds a static network that only considers the sum of each editor's relation with another, rather than how the editors have interacted through time. Thus, the static network is unable to capture changes in the editors' relationships as well as the dynamics of editing behaviors (e.g., do certain interactions give rise to more of the same type?).

Sumi et al. (see Literature Reference No. 8) performed a temporal analysis of burstiness in an article's revision and talk page histories to assess whether the article is undergoing a period of high editor conflict or has been vandalized. They considered only one type of edit, the revert, in determining the controversial status of the page. Furthermore, they also analyzed the controversial status relative to the page length and its talk page's length, showing longer talk pages are correlated with controversial status. However, their approach does not take into account how editors interact other than by reverting each others changes.

Kittur et al. (see Literature Reference No. 3) analyzed conflict and coordinates in pages by training a support vector machine (SVM) classifier on page-related features. Their follow-up feature analysis showed that certain types of editors and edits were strongly correlated with controversial pages. However, their model does not incorporate the interactions between editors. In a second experiment, they built a graph of users that had reverted each other's changes, which they partitioned to discover mutually conflicting groups. Similar to Brandes and Lerner (see Literature Reference No. 1), this approach cannot discover changes in behavior over time or the dynamics of the interactions.

Kovanen et al. (see Literature Reference No. 4) demonstrated how to construct and detect temporal motifs using a set of randomized null models. However, they do not apply the results of motif detection to any purpose.

Each of the prior methods above exhibit limitations that make them incomplete. Thus, a continuing need exists for a system and method that enables both productive and destructive editing behavior analysis in collaborative media, such as Wikipedia.

SUMMARY OF THE INVENTION

The present invention relates to a system for automated classification of user behavior and interactions in collaborative media. The system comprises one or more processors and a memory having instructions such that when the instructions are executed, the one or more processors perform multiple operations. The system receives an input documents and change log files of a collaborative media, where the documents are continuously edited by multiple authors and where edits are recorded in the change log files. A type of editing behavior by the authors of a given document is identified, and the edits made to the document are analyzed. The system reports how the authors interacted in a collaboration process, resulting in a set of reported author interactions. From the set of reported author interactions, a set of author interactions that are most and least significant in the collaboration process are identified. Then, based on the set of identified author interactions, future effects on documents of the collaborative media are estimated.

In another aspect, the plurality of documents and the plurality of change log files are represented as a temporal bipartite network, wherein the temporal bipartite network comprises a plurality of author type nodes, a plurality of page nodes, and a plurality of temporal edges annotating the time of the edits.

In another aspect, the system utilizes the plurality of change log files to annotate the plurality of author type nodes in the temporal bipartite network, wherein a node-colored temporal bipartite network is generated.

In another aspect, the system classifies the edits into different types and annotates the plurality of temporal edges with classified edge types, wherein an edge-colored temporal bipartite network is generated.

In another aspect, the system extracts a set of author interactions into temporal motifs that represent collaborative behavior patterns.

In another aspect, the system quantifies a statistical significance of the temporal motifs.

As can be appreciated by one in the art, the present invention also comprises a method for causing a processor to perform the operations described herein.

Finally, the present invention also comprises a computer program product comprising computer-readable instruction means stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
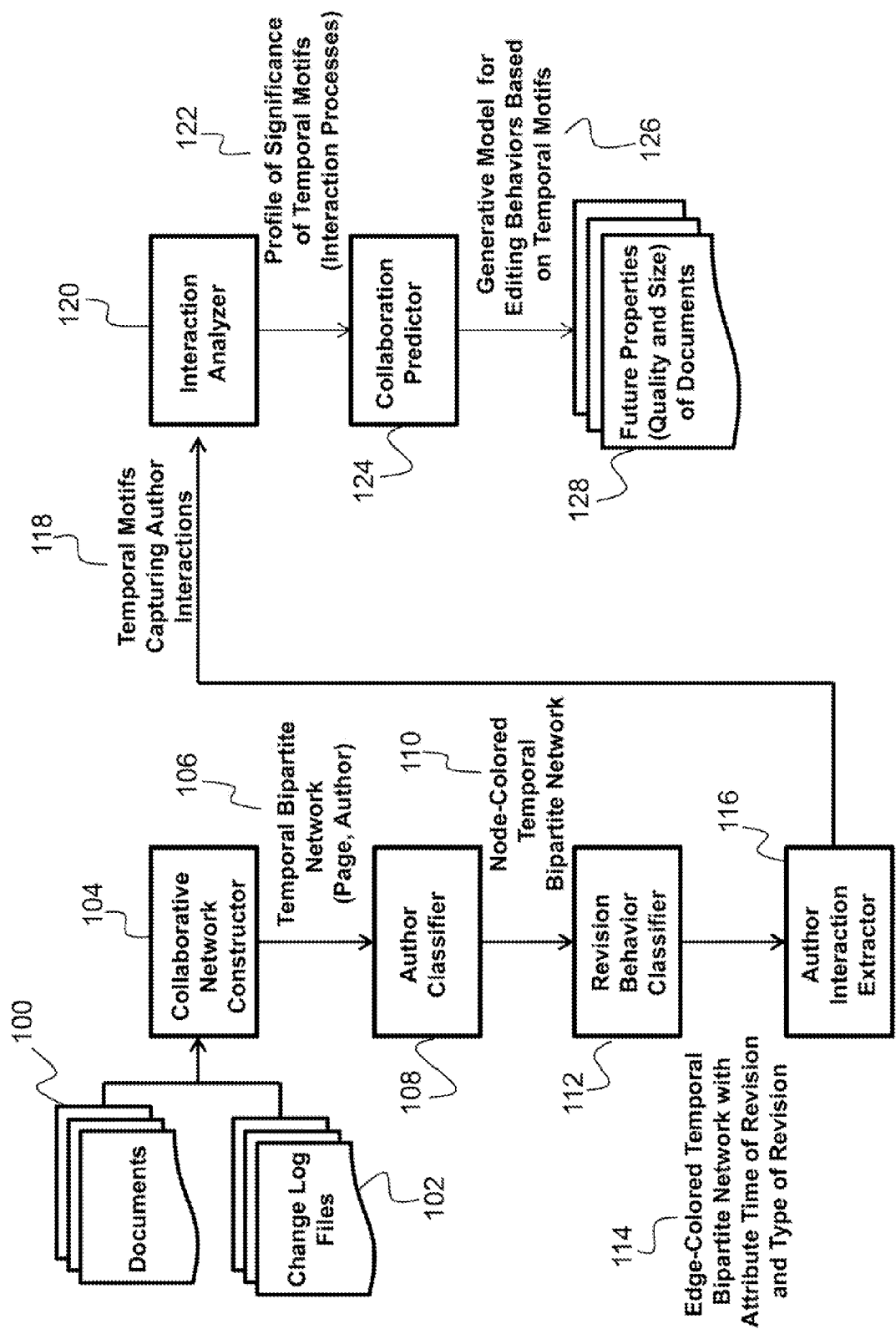
FIG. 1 is a flow diagram depicting the functional modules of the automated collaborative behavior analysis system according to the present invention.

The present invention relates to a system for automated classification of user behavior and interactions in collaborative media and, more particularly, to a system for automated classification of user behavior and interactions in collaborative media using temporal motifs. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided. Next, a description of various principal aspects of the present invention is provided. Subsequently, an introduction provides the reader with a general understanding of the present invention. Finally, specific details of the present invention are provided to give an understanding of the specific aspects.

(1) List of Cited Literature References

The following references are cited throughout this application. For clarity and convenience, the references are listed herein as a central resource for the reader. The following references are hereby incorporated by reference as though fully included herein. The references are cited in the application by referring to the corresponding literature reference number, as follows:

1. Brandes, U., and Lerner, J. 2008. Visual analysis of controversy in user-generated encyclopedias. Information Visualization 7(1):34-48.
2. Brandes, U.; Kenis, P.; Lerner, J.; and Van Raaij, D. 2009. Network analysis of collaboration structure in wikipedia. In Proceedings of the 18th international conference on World Wide Web (WWW), 731-740. ACM.
3. Kittur, A.; Suh, B.; Pendleton, B.; and Chi, E. 2007. He says, she says: Conflict and coordination in wikipedia. In Proceedings of the SIGCHI conference on Human factors in computing systems, 453-462. ACM.
4. Kovanen, L.; Karsai, M.; Kaski, K.; Kertsz, J.; and Saramki, J. 2011. Temporal motifs in time-dependent networks. Journal of Statistical Mechanics: Theory and Experiment, 11:P11005.
5. Laniado, D., and Tasso, R. 2011. Co-authorship 2.0: Patterns of collaboration in wikipedia. In Proceedings of the 22nd ACM conference on Hypertext and hypermedia, 201-210. ACM.
6. Laniado, D.; Tasso, R.; Volkovich, Y.; and Kaltenbrunner, A. 2011. When the wikipedians talk: network and tree structure of wikipedia discussion pages. Proceedings of ICWSM.
7. Roth, C.; Taraborelli, D.; and Gilbert, N. 2008. Measuring wiki viability: An empirical assessment of the social dynamics of a large sample of wikis. In Proceedings of the 4th International Symposium on Wikis, 27. ACM.
8. Sumi, R.; Yasseri, T.; Rung, A.; Kornai, A.; and Kerte'sz, J. 2011. Edit wars in wikipedia. Arxiv preprint arXiv:1107,3689.
9. Wu, G.; Harrigan, M.; and Cunningham, P. 2011. A characterization of wikipedia content based on motifs in the edit graph. (UCD-CSI-2011-02).
10. Suh, B.; Convertino, G.; Chi, E.; and Pirelli, P. 2009. The singularity is not near:slowing growth of wikipedia. In Proceedings of the 5th International Symposium on Wilds and Open Collaboration, 8. ACM.
11. Newman, M. 2005. Power laws, pareto distributions and zipf's law. Contemporary physics 46(5):323-351.
12. Milo, R.; Shen-Orr, S.; Itzkovitz, S.; Kashtan, N.; Chklovskii, D.; and Alon, U. 2002. Network motifs: simple building blocks of complex networks. Science 298(5594):824.
13. Blei, D.; Ng, A.; and Jordan, M. 2003. Latent dirichlet allocation. The Journal of Machine Learning Research 3:993-1022.
14. Casella, George; George, Edward I. 1992. Explaining the Gibbs sampler. The American Statistician. 46(3): 167-174.

(2) Principal Aspects

The present invention has three "principal" aspects. The first is a system for automated classification of user behavior and interactions in collaborative media. The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a method for automated classification of user behavior and interactions in collaborative media. The third principal aspect is a computer program product. The computer program product generally represents computer-readable instruction means (instructions) stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instructions" as used with respect to this invention generally indicates a set of operations to be performed on a computer, and may represent pieces of a whole program or individual, separable, software modules. Non-limiting examples of "instructions" include computer program code (source or object code) and "hard-coded" electronics (i.e., computer operations coded into a computer chip). The "instructions" may be stored on any non-transitory computer-readable medium such as a floppy disk, a CD-ROM, a flash drive, and in the memory of a computer.

(3) Introduction

In the invention described herein, a data-driven model of behavior interactions is presented, which is useful in both analyzing multiple aspects of a collaborative media (a non-limiting example of which includes Wikipedia) and predicting its future growth under different scenarios of editor behavior. Much of the current analysis of Wikipedia's authors interaction has focused on high-level characteristics such as the number of inter-editor reverts (see Literature Reference No. 3) or interactions on Talk pages (see Literature Reference No. 6). Recent studies have begun assessing the impact of specific editing behavior by looking at how editors revise each other's work (see Literature Reference Nos. 2 and 5). However, the focus has been on identifying contentious behavior between editors, and, accordingly, almost all models are limited in their ability to represent and analyze productive, collaborative behaviors.

To achieve a full analysis of both productive and destructive editing behavior, the present invention comprises a method of pattern analysis on Wikipedia's revision history. The revision history of Wikipedia can be viewed as a bipartite graph from editors to pages. Enriching this graph with temporal information of both who edited the page, and how, enables the discovery of meaningful editing behavior in the form of network motifs. These temporal motifs are repeated sub-graphs of the editing graph which correspond to significant patterns of collaborative interactions. Furthermore, the discovered motifs represent multiple types of editor behavior in a single framework, which allows one to compare the different modes of interaction and their relations to page properties, such as quality and level of conflict.

Contributions of the present invention, which will be described in further detail below, are as follows. A network representation of collaboration histories (e.g., Wikipedia's revision history) is defined as a dynamically evolving bipartite graph with multiple node and edge colors. Furthermore, a method for identifying core interactions through a motif-based analysis of the graph is described. From these discovered motifs, the present invention further comprises methods for (1) analyzing documents for collaborative and combative behavior and (2) quantifying the effects of authors' behaviors. Lastly, a generative model for Wikipedia's growth is derived from motifs-based interactions, which is then utilized to predict its future growth.

The website Wikipedia is referenced throughout this application as a specific example for convenience purposes only. As can be appreciated by one skilled in the art, it should be understood that Wikipedia is only provided as a non-limiting example and any suitable collaborative media could be substituted in the descriptions provided herein. Any collaboration activities which are logged into text files could be used. For example, vehicle maintenance logs are another type of collaborative media. Different service/maintenance personnel can perform repairs/activities and input these into the maintenance logs. Patterns of repairs or sequences of repairs could then be discovered (e.g., an incorrect repair causes a sequence of follow-up repairs).

(4) Specific Details (4.1) Workflow of Automated Collaborative Behavior Analysis System FIG. 1 is a diagram illustrating the workflow and functional modules of the present invention, which will be described in further detail below. As shown, the system takes in documents 100 and change log files 102 as inputs. The system comprises a collaborative network constructor 104, which represents the documents 100 and their change log files 102 as a temporal bipartite network 106 (graph) comprising author nodes and page nodes. An author classifier 108 classifies author nodes in the bipartite graph according to their roles in the collaborative network, resulting in a node-colored temporal bipartite network 110. A revision behavior classifier 112 classifies each edit according to learned classes of editing behaviors, resulting in an edge-colored temporal bipartite network with attribute time of revision and type of revision 114. An author interaction extractor 116 identifies and extracts author editing interactions into temporal motifs capturing author interactions 118 that represent collaborative behavior patterns. An interaction analyzer 120 quantifies the statistical significance of identified temporal motifs (i.e., author interactions) to generate a profile of significance of temporal motifs (interaction processes) 122. Finally, a collaboration predictor 124 learns a generative model for editing behaviors based on the temporal motifs 126 to simulate future properties (e.g., quality, size) of documents 128 based on author interactions captured in temporal motifs. Each of these modules is described in further detail below.

(4.2) Collaborative Network Constructor

At a basic level, a document such as Wikipedia may be viewed as a bipartite graph from authors to the pages to which they contribute. In the present invention, this representation was expanded to encode three additional features: (1) the type of author who made the change, (2) the time at which the change was made, and (3) the magnitude and effect of the change on the page, as represented by the collaborative network constructor (FIG. 1, reference element 104). Together, these three features create a temporal bipartite network (FIG. 1, reference element 106), or graph, that has node attributes corresponding to author type and edge attributes for the type of revision. Full behavior analysis is enabled by the temporal motif methodology described herein. In other words, temporal motifs capture not only "productive" or "destructive" behaviors, but even "neutral" behaviors. The temporal bipartite graph of Wikipedia revisions, $G=(V, E)$, can be formally defined as follows:

The set of nodes V are the union ($\cup$) of the sets of authors $A=\{a_1, \ldots, a_m\}$ and pages $P=\{p_1, \ldots, p_n\}$ (i.e., $V=A \cup P$).

1. Each author $a_i$ is associated with an attribute defining the class of authors of which it is a member, $c(a_i)=$ {registered,anonymous,admin,bot}. An author's class is fixed throughout the graph's time span.

The set E contains directed edges from an author in $a_i \in A$ to page $p_j \in P$, with one edge per revision, where $\in$ denotes "is an element of". Each edge $e_i \in E$ is associated with two attributes:

1. The time $t_i$ at which its revision was made, which is a discrete time value in the range of the network's lifetime $t_0, \ldots, t_n$. Due to Wikipedia revision constraints, two edges to the same page may not have the same time (i.e., no simultaneous revision are allowed).
2. The class describing the effect of the edit, $c(e_i)=$ {minor add, major add, minor edit, major edit, minor delete, major delete, revert}.

Reterrina to FIG. 1, the collaborative network constructor 104 takes the documents 100 and their change log files 102 to first construct the temporal bipartite network 106 with page and authors node types, and temporal edges annotating the time of edits. The author classifier 108 and the revision behavior classifier 112 then further annotate node attributes and edge attributes of the network (graph) to differentiate the type of authors and the type of edits, as will be described in further detail below.

(4.3) Author Classifier

The author classifier (FIG. 1, reference element 108) takes the information in the change log files (FIG. 1, reference element 102) to annotate author nodes in temporal bipartite graphs, generating a node-colored temporal bipartite network (FIG. 1, reference element 110). There are often author classes predefined in a collaborative editing system. Although such author classes could be used directly to annotate the temporal bipartite graph, they may not be useful or applicable to the kind of analysis that one would like to perform on the temporal bipartite graph. In order to facilitate collaborative behavior analysis, the author classifier (FIG. 1, reference element 108) of the present invention enables users to learn and define author types from author classes of the collaborative systems in order to identify proper author type attributes for the analysis.

Wikipedia provides a hierarchy of user types, each having its own level of permissions, with bureaucrats and system operators at the top and anonymous users at the bottom. Users near the top of the hierarchy have increased editing and administrative capabilities (e.g., banning users) and are frequently more engaged in Wikipedia. In the present invention, all users are divided into four categories: administrator, bot, registered, and anonymous.

The administrator category contains all users with at least administrator rights, which also includes bureaucrats and stewards. The bot category contains all user names associated with automated programs that autonomously edit the content of Wikipedia. Bots perform a variety of editing tasks from routine changes, such as spelling correction or ensuring consistent Wiki formatting, to high impact changes such as importing large sections of text from other sites into Wikipedia's articles. Furthermore, bots often take on the more menial tasks once done manually by administrators, which have been suggested as the reason for administrator's decline in activity (see Literature Reference Nos. 3 and 10). While users may run bot programs under their own accounts, the category defined in experimental studies of the present invention contains only those bots that have been approved by Wikipedia administrators to operate independently from their own account. However, one can use the same methodology for bots that are not approved by Wikipedia administrators as well.

The authors are labeled as follows. All revisions with an internet protocol (IP) address for the author are labeled as anonymous. The Wikipedia:Bots/Status page was used to identify the 2271 usernames registered to bots, and the Special:ListUsers/sysop page was used to identify 1514 administrators and label their revisions accordingly. All other authors were classified as registered users.

(4.4) Revision Behavior Classifier

Referring back to FIG. 1, the revision behavior classifier 112 takes verbatim comments and the effect of changes in the change log files and documents them to derive revision classes to annotate edges in temporal bipartite graphs. In order to capture the essence of editing instances, the revision behavior classifier 112 will classify the edits into different types and annotate the edges of the temporal bipartite graph with classified edge types (represented by reference element 114).

Wikipedia revisions vary considerably in their effect on a page's content, from small copy editing, to adding new sections, to reverting multiple changes at once. While understanding the author's intent behind these actions is not always possible, one can still categorize their effect into broad classes in order to discover patterns in editing behavior. Specifically, four high-level categories were selected for revisions: adding, deleting, editing, and reverting. Adding and deleting behaviors corresponds to changes in the size of a page's content, whereas editing behavior revises the existing content (e.g., fix typos, merge and split subsections), but does not significantly affect the page size. Reversion is treated as a special type of behavior where one editor undoes one or more previous revisions to a page, returning it to an earlier state.

To classify revisions into adding, deleting, and editing behaviors, each revision was analyzed in terms of two parameters: (1) the number of whitespace-delimited tokens added or removed from the page, $\delta$ (i.e., its change in size), and (2) the number of tokens whose content was changed, $\theta$. Token changes include character insertions, removals, and additions, as well as adding and removing tokens. These two parameters capture many characteristic types of user behavior. For example, a revision that fixes grammatical mistakes will have a larger number of token changes, but it is unlikely to increase the page size. Conversely, adding new content to a page will likely have proportional values for $\delta$ and $\theta$. In addition, these parameters are largely independent of the page size itself, with Pearson correlations of $\rho(\delta,\ \text{size})=0.147$ and $\rho(\theta,\ \text{size})=0.142$, which makes them suitable for classification across all revisions. As can be appreciated by one skilled in the art, one could use other correlations to come to the same conclusion.

Reversion revisions are identified using two processes. First, the comment associated with a revision is matched against a fixed set of phrases that are known to be made by editors when reverting a page's content (e.g., "reverting," "rv," or "rvv"). While these capture the majority of reversions, some editors choose not to leave comments, or do not indicate the revert in their comments. Therefore, the strategy of Kittur et al. (see Literature Reference No. 3) was adopted. An MD5 message-digest algorithm hash is computed for the full text (including wiki markup) of each revision. Then, the hash is matched against the hashes of all previous revisions of the page to check whether the current content is equivalent; if so, the change is marked as a revert. Both strategies are necessary to capture edge cases, where an editor performs a partial revert of the contents and comments on it, and where an edit reverts the entire page but does not comment to that effect.

All other non-revert revisions are classified by assessing whether content creation or deletion was responsible for the majority of the token changes. Specifically, a revision r is classified according to the following:

| class(r) = | EDIT | if $|\delta/\theta| < 0.5$ |
|---|---|---|
| | ADD | if $\delta > 0$ |
| | DELETE | otherwise |

Simply, a revision is classified as editing if more existing tokens were changed than were added or deleted; otherwise the revision is classified according to the net effect on the size of the page.

Based on the power-law distribution, each class is divided into major and minor subcategories (or any other suitable rule) using the Pareto principle, or "80/20" (see Literature Reference No. 11), which in the present case translates as 80% of the editing effects come from the most frequent 20% of the types of edit instances. That is, the revisions with small effects account for the majority of the cumulative effects to the content. Therefore, the classes are divided such that ADD revisions with $\delta>35$ are major, DELETE revisions with $\delta<-47$ are major, and EDIT revisions with $\theta>11$ are major. Revisions under these thresholds are considered "minor".

(4.5) Author Interaction Extractor and Analyzer

Figure 2:
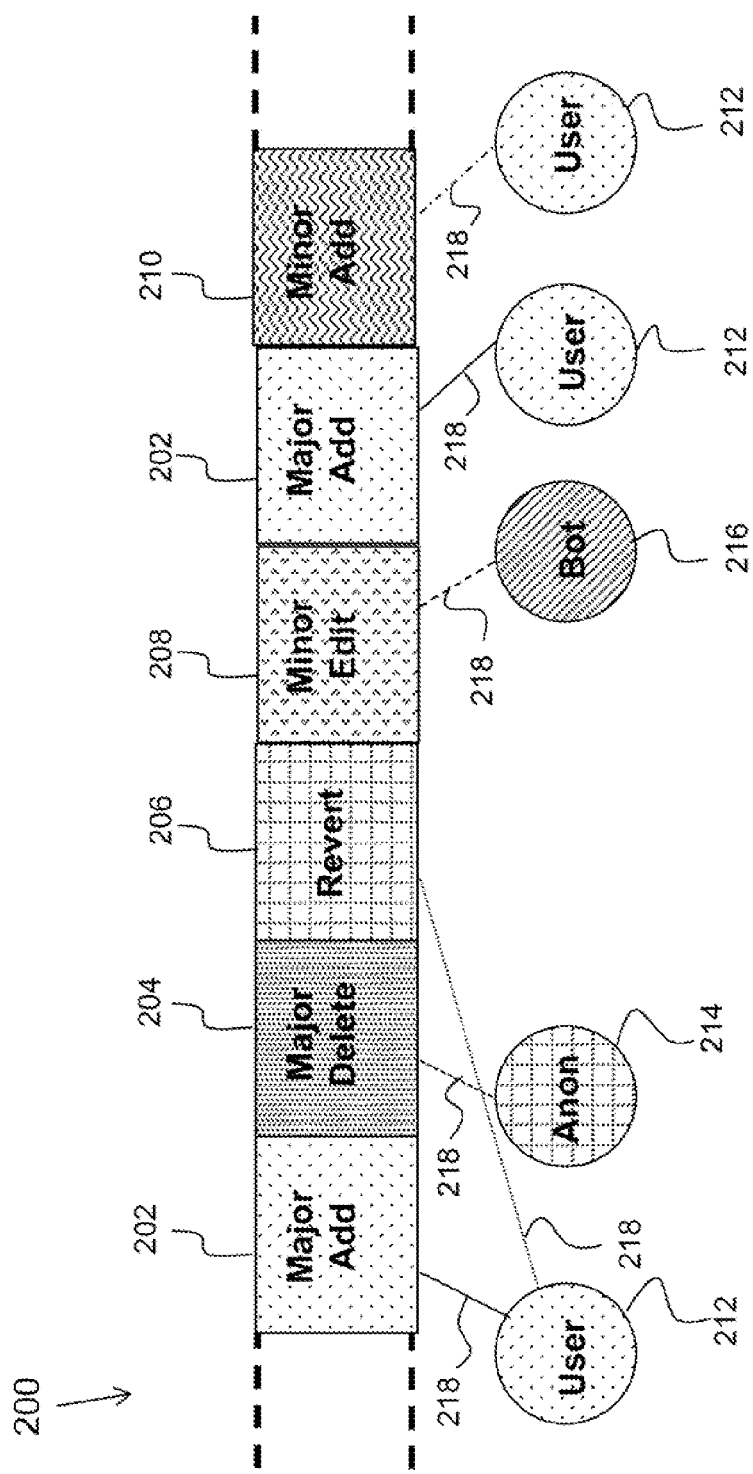
FIG. 2 is an illustration of a temporal bipartite graph of a Wikipedia page according to the present invention.

The temporal bipartite graph constructed for collaborative behavior analysis can be considered a revision graph which contains editor interactions as temporally contiguous subgraphs. FIG. 2 illustrates a temporal bipartite graph 200 of a subset of a page's history as a sequence of classified revisions (e.g., major Add 202, Major Delete 204, Revert 206, Minor Edit 208, Minor Add 210) after applying the network constructor, author classifier, and revision behavior classifier. These revisions can be divided into motifs of different sizes. A collaborative editing system, such as Wikipedia, can be viewed as a temporal, bipartite graph (or network) from users to pages that they edit. FIG. 2 shows multiple users/authors (e.g., user 212, anonymous (anon) 214, and bot 216) editing the same page in succession. The shading variations between the author nodes in FIG. 2 represent the annotation of the author nodes by the author classifier to generate a node-colored temporal bipartite graph 200. Furthermore, the temporal sequences of editing behavior for repeated patterns capture the domain collaborative editing methods used by authors. The temporal edges of the temporal bipartite graph 200 are annotated with classified edge types to generate an edge-colored temporal bipartite network. Various solid and dashed lines 218 and shading of the classified revisions (e.g., Major Add 202, Major Delete 204, Revert 206, Minor Edit 208, Minor Add 210) are used to depict various edge colors of the edge-colored temporal bipartite network. The distribution of these sub-graphs (or temporal motifs) across all of Wikipedia's history reveals how particular interactions impact the overall growth of its content. Specifically, these sub-graphs can be analyzed as network motif, or repeated network structures, which constitute meaningful building blocks of a more complex network (see Literature Reference No. 12).

In a temporal network, such as the Wikipedia revision graph, one can also identify temporal motifs, which are made of temporally-contiguous updates to the network. These temporal motifs reflect the underlying dynamics of how the network evolves. A set of candidate motifs was selected from all sub-graphs made of three contiguous edits on a single page. The resulting set contained a variety of sub-graph configurations, from two vertices (e.g., one author making three changes in a row) to four vertices (e.g., three different authors). This motif range was selected to capture the reactions of authors when another author has revised their changes. Using four vertex colors and seven edge colors, a total of 39,788 unique author interaction motif instances are possible. Each motif is associated with three pieces of external information: (1) the cumulative θ, (2) the net effect on the number of terms, and (3) its average duration. The author interaction extractor of the present invention performs sub-graph extraction to identify the temporal motifs that exist in the revision graph (i.e., temporal bipartite graph).

Typically, motifs are analyzed by comparing the distribution of sub-graphs in a network relative to a null model. Sub-graphs that appear more frequently than expected in the null model are considered meaningful motifs; likewise, sub-graphs that appear less frequently than expected identify network structures that might be suppressed due to external forces. The expected frequencies of each motif are calculated by repeatedly sampling networks from a null model and computing the frequency distributions of the motifs therein. The choice in null model is the key to motif detection. The structural (and temporal) configuration of the networks in the null model must match those of the original in order to properly estimate the expected motif frequencies. In a simple network, with undirected edges and no edge and vertex colors, the null model may be computed by randomizing the test network while still preserving its degree sequence (i.e., the number of edges connected to each vertex remains the same while the identity of the connected vertices varies).

In the revision graph of the present invention, a model is constructed from a page-local null hypothesis that assesses whether the revisions to that page contain statistically significant motif patterns. Following the null model construction suggested in Literature Reference No. 4, the revisions for each page are randomized the network in such a way as to preserve both the degree sequence of the authors as well as the vertex and edge coloring distributions. Essentially, each page must be revised in the same way by the same type of author, but the identity of that author may change. Each randomization creates a new temporal sequence of revisions for determining the significance of editor interactions. The edges of the network are randomized 5,000 times to estimate the frequency statistics of each motif. The number of randomizations is adjustable and should be tuned so that the expected value for all motifs remains stable.

(4.6) Collaboration Predictor

To predict behaviors in a collaborative system, the present invention utilizes author interaction patterns identified by the author interaction extractor and analyzer described above as the basis of building a generative model to predict the future collaboration over the documents. First, the collaboration predictor learns parameters for the generative models from identified temporal motifs and then simulates the effect of editing in the future given the collaborative behaviors. Wikipedia is used as a non-limiting example, where content is the result of multiple editors working together. However, the types of collaborations on a page may vary widely according to topic matter. For example, a highly specialized topic may have very few authors qualified to edit the article and so the behavior is primarily single author driven; whereas, a controversial page may enjoy wide public knowledge with many editors revising or reverting each other's work. The types of collaborations seen on these pages are characterized in terms of editing behaviors, which represent probability distributions over the types of interactions an author is likely to have when working on a page. Using behaviors as a starting point, the generative process for a model is first described, and then the method of inference procedure for learning the behaviors automatically is described.

Behaviors are defined as a set of multinomial distributions, $\{\phi_1, \ldots, \phi_B\}$ over the space of interactions represented through unique motif instances $\{m_1, \ldots, m_M\}$. An article is defined as a distribution over behaviors $\gamma$, which reflects the kinds of interactions editors are likely to have when editing that article. The generative case is summarized as follows, where ~ is an operator stating that the sample follows from the distribution after the symbol:

1. sample $\gamma_j$~Dirichlet($\alpha$)
2. sample $\phi_B$~Dirichlet($\beta$)
3. for each $N_i$ interaction in article j
    1. sample a behavior $\phi_{i,j}$~multinomial($\gamma_j$)
    2. sample a motif $m_{i,j}$~multinomial($\phi_{i,j}$)

Both the distribution of behaviors in a document and the interactions of a behavior are conditioned by Dirichlet priors (as shown above), which enforce a sparsity constraint where few behaviors are expected per document and each behavior is comprised of only a few interaction types. In summary, the motif history of an article is built by repeatedly sampling behaviors for that page, and then sampling motif instances for each behavior.

This generative model is analogous to that of Latent Dirichlet allocation (see Literature Reference No. 13), where motifs are equivalent to tokens and behaviors to topics. Accordingly, Gibbs sampling (see Literature Reference No. 14) is performed to infer the $\gamma$ and $\phi$ parameters of the model, with $\alpha=1$ and $\beta=0.01$. The model was implemented using the open source software Machine Learning for Language Toolkit (MALLET) library, version 2.07, developed by Andrew Kachites McCallum at the University of Massachusetts Amherst. Once the model has been learned, one performs the generative process using the empirical priors for $\alpha$ and $\beta$.

(4.7) Experimental Results

An initial case study is presented below using a complete revision history of Wikipedia, ending on Apr. 5, 2011. Because the primary focus of this work is editor interaction on articles, the analysis was restricted to article pages that have at least 10 revisions in their history. The resulting data set contained 2,715,123 articles and 227,034,806 revisions, which contained 218,888,570 total motifs, 39,034 of which were unique. Fragments (i.e., temporal motif) of the network constructed after applying the collaborative network constructor, the author classifier, and the revision behavior classifier are depicted in FIG. 2.

Figure 3A:
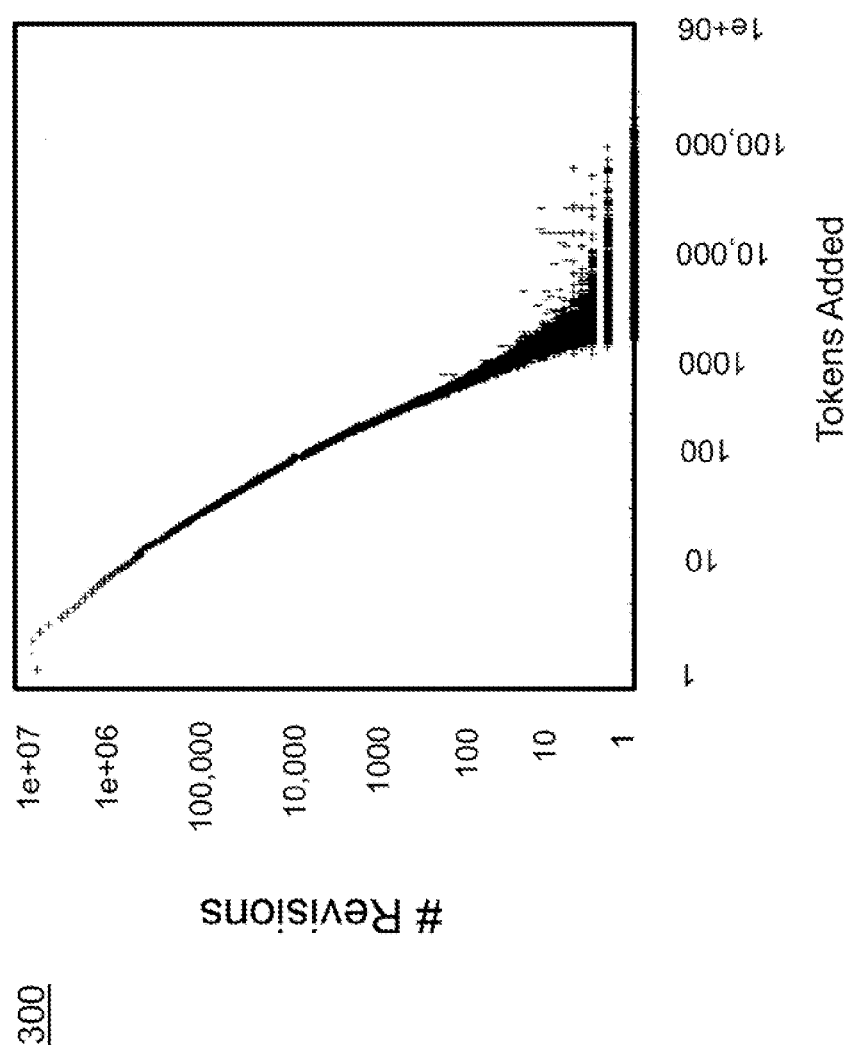
FIG. 3A is a plot illustrating a distribution of revisions in Wikipedia based on adding tokens according to the present invention.
Figure 3B:
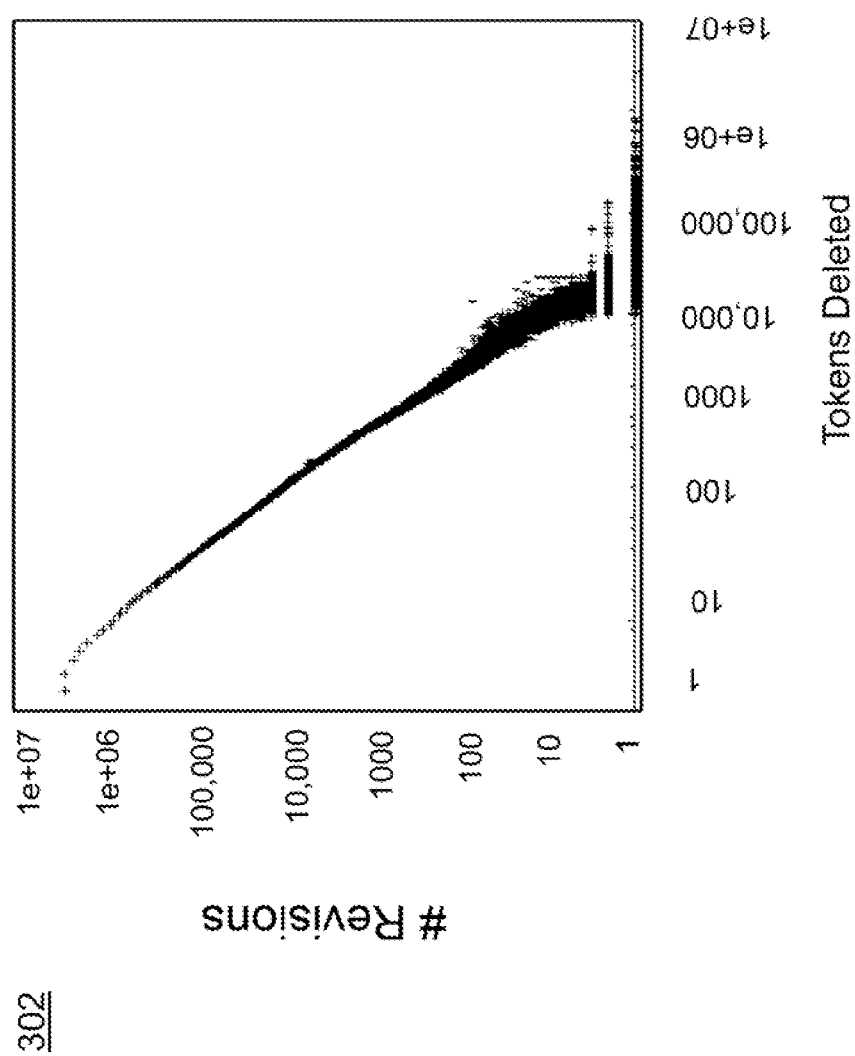
FIG. 3B is a plot illustrating a distribution of revisions in Wikipedia based on deleting tokens according to the present invention.
Figure 3C:
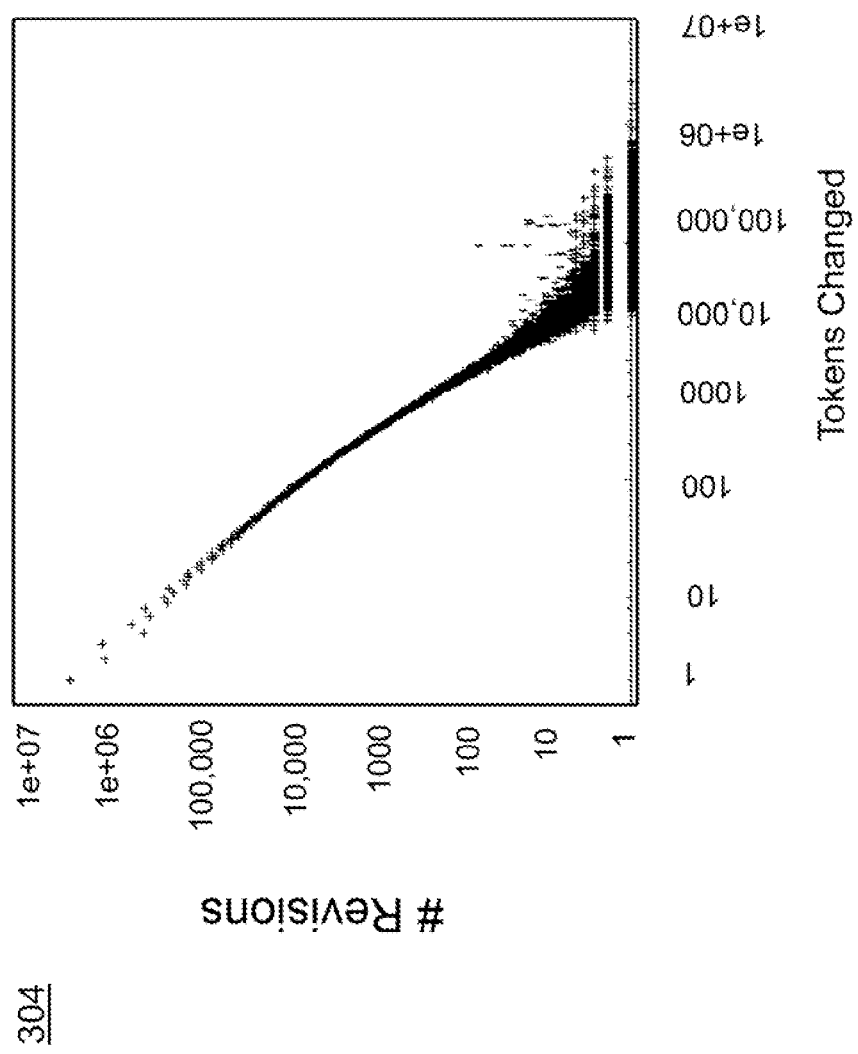
FIG. 3C is a plot illustrating as distribution of revisions in Wikipedia based on changing tokens according to the present invention.

FIGS. 3A, 3B, and 3C are graphs indicating the distribution of revisions according to their primary effects, adding, deleting, or changing tokens, respectively, as classified by the revision behavior classifiers of the present invention. Specifically, FIG. 3A depicts a graph 300 of "add" revisions; FIG. 3B depicts a graph 302 of "delete" revisions; and FIG. 3C depicts a graph 304 of "change" revisions. The number of revisions for each graph is along the y-axis, while the number of tokens added, deleted, or changed is along the x-axis. The distributions all follow a power law like curve, showing that the majority of changes to Wikipedia come from edits with small effects.

Figure 4:
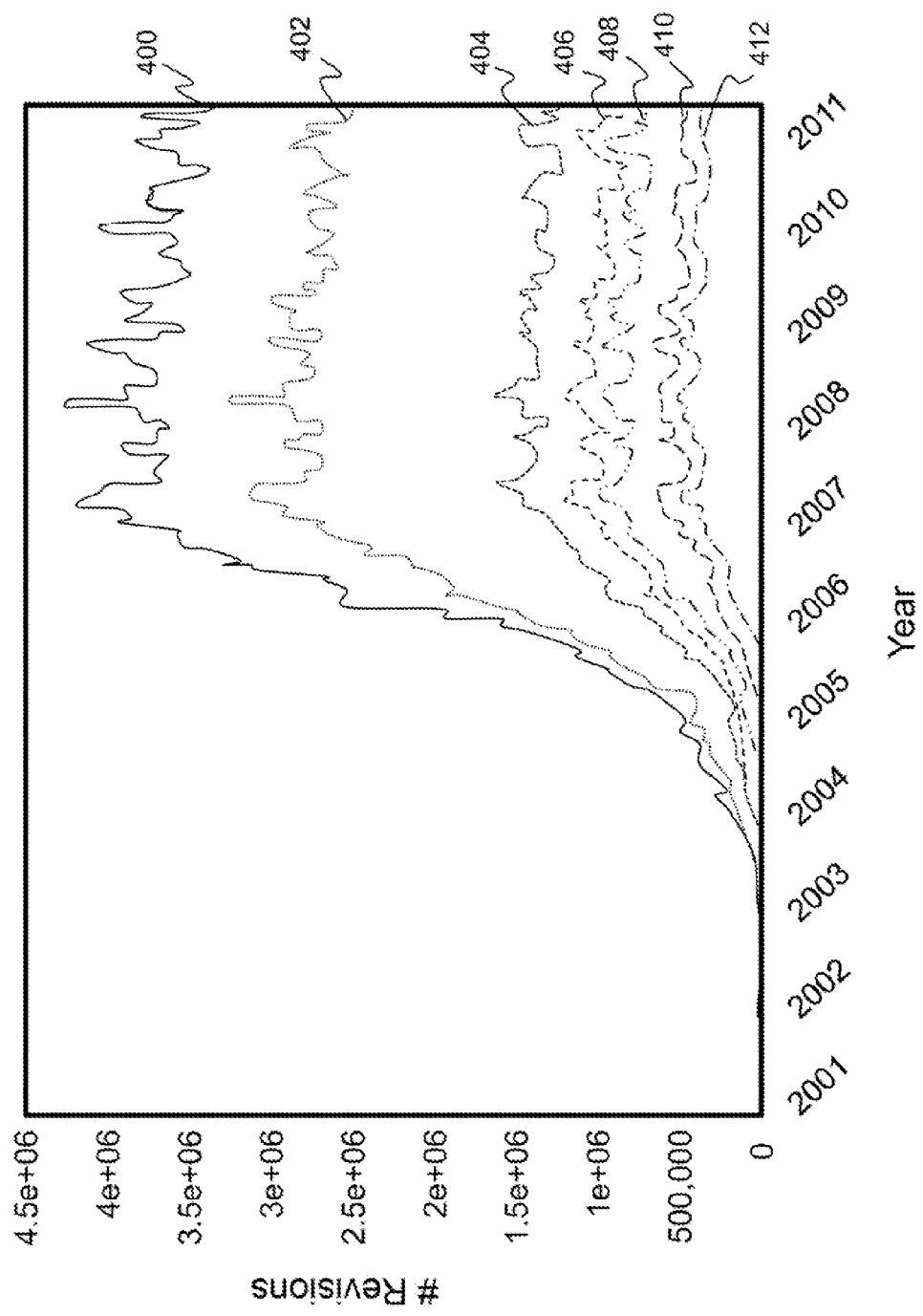
FIG. 4 is a plot illustrating the frequency of edit types from January 2001 to March 2011 in Wikipedia according to the present invention.

FIG. 4 is a graph showing the frequency of edit types from January of March 2001 to March of 2011 in Wikipedia as classified by the revision behavior classifiers of the present invention. Along the x-axis is the year, and along the y-axis is the number of revisions. The graph indicates that minor edits 400 are the most frequent edit type followed by minor additions 402, minor deletions 404, major edits 406, major additions 408, major deletions 410, and reverts 412.

Figure 5:
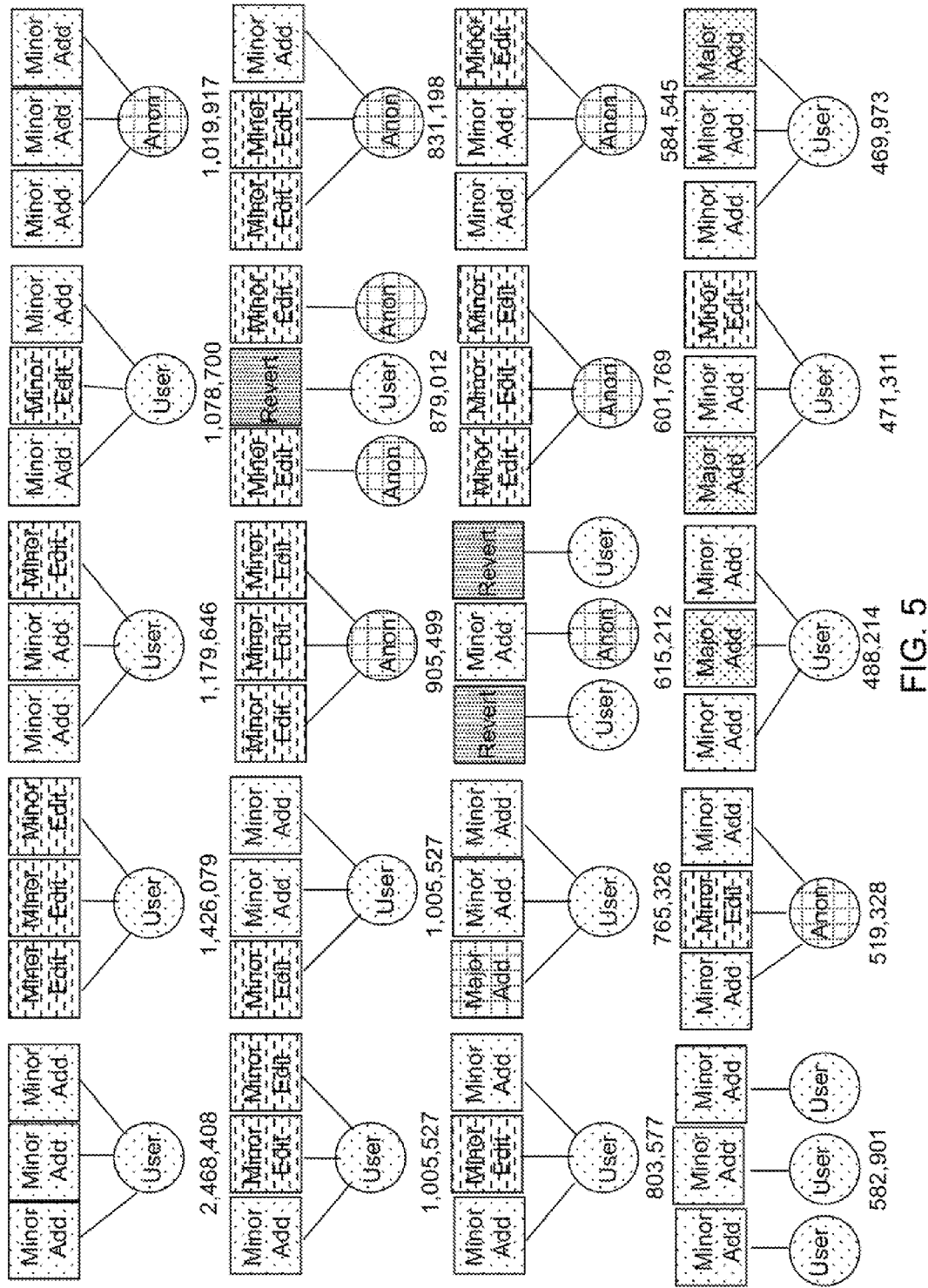
FIG. 5 is an illustration of the twenty most frequent temporal motifs in Wikipedia collaborating behaviors according to the present invention.

FIG. 5 is an illustration of the 20 most frequent temporal motifs (i.e., each sub-graph), as indicated by a listed frequency beneath each motif, in Wikipedia collaborative editing behaviors that were identified and analyzed by the author interaction extraction and analyzer of the present invention. The illustration indicates that single-author revisions (i.e., those having only one author node) are the predominant method of editing. Various shading represents the various colors of the node-colored temporal bipartite network.

Figure 6:
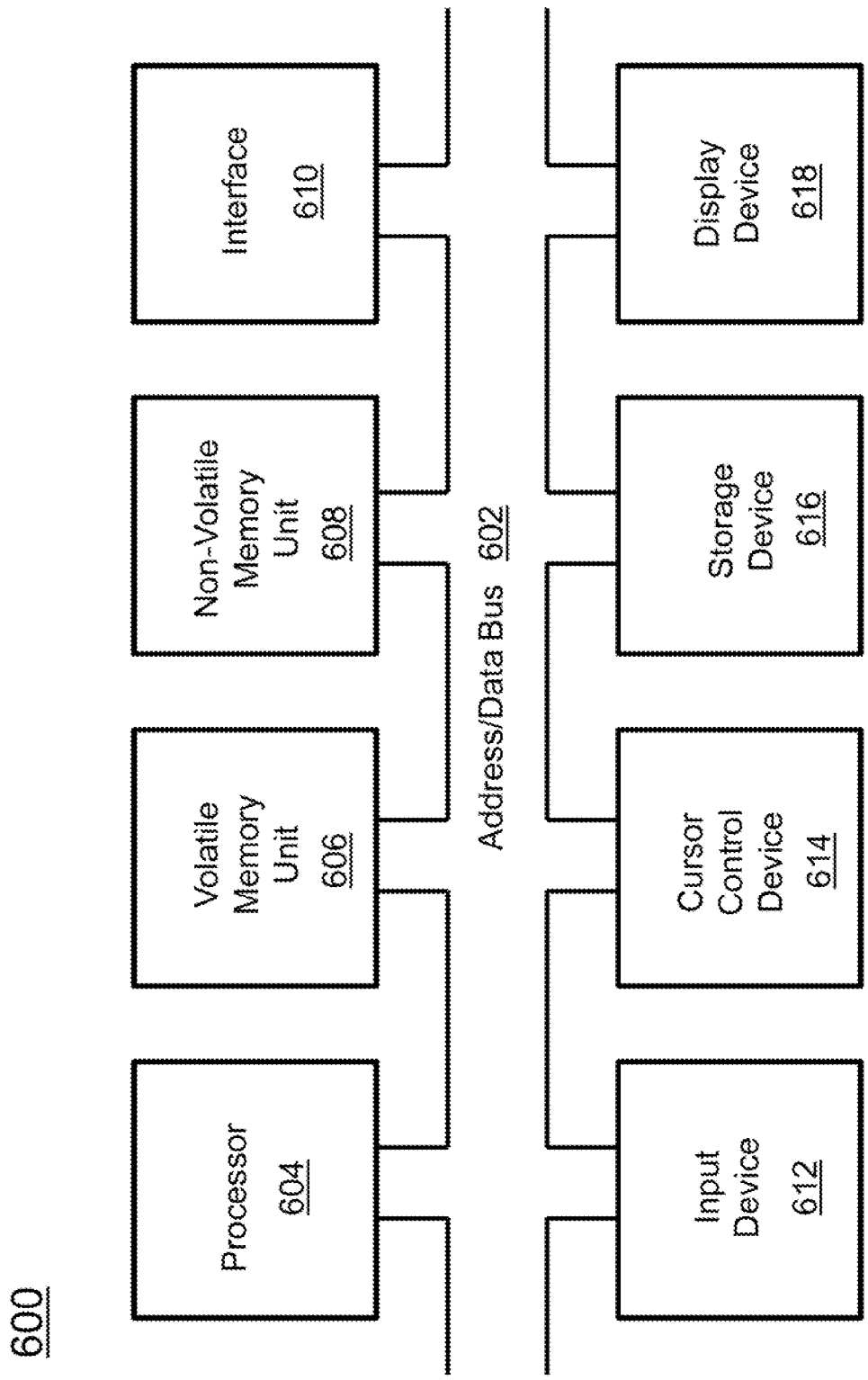
FIG. 6 is an illustration of a data processing system according to the present invention.

An example of a computer system 600 in accordance with one aspect is shown in FIG. 6. The computer system 600 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 600. When executed, the instructions cause the computer system 600 to perform specific actions and exhibit specific behavior, such as described herein.

The computer system 600 may include an address/data bus 602 that is configured to communicate information. Additionally, one or more data processing units, such as a processor 604, are coupled with the address/data bus 602. The processor 604 is configured to process information and instructions. In one aspect, the processor 604 is a microprocessor. Alternatively, the processor 604 may be a different type of processor such as a parallel processor, or a field programmable gate array.

The computer system 600 is configured to utilize one or more data storage units. The computer system 600 may include a volatile memory unit 606 (e.g., random access memory ("RAM"), static RAM, dynamic RAM, etc.) coupled with the address/data bus 602, wherein a volatile memory unit 606 is configured to store information and instructions for the processor 604. The computer system 600 further may include a non-volatile memory unit 608 (e.g., read-only memory ("ROM"), programmable ROM ("PROM"), erasable programmable ROM ("EPROM"), electrically erasable programmable ROM "EEPROM"), flash memory, etc.) coupled with the address/data bus 602, wherein the non-volatile memory unit 608 is configured to store static information and instructions for the processor 604. Alternatively, the computer system 600 may execute instructions retrieved from an online data storage unit such as in "Cloud" computing. In an embodiment, the computer system 600 also may include one or more interfaces, such as an interface 610, coupled with the address/data bus 602. The one or more interfaces are configured to enable the computer system 600 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 600 may include an input device 612 coupled with the address/data bus 602, wherein the input device 612 is configured to communicate information and command selections to the processor 600. In accordance with one aspect, the input device 612 is an alphanumeric input device, such as a keyboard, that may include alphanumeric, and/or function keys. Alternatively, the input device 612 may be an input device other than an alphanumeric input device. In one aspect, the computer system 600 may include a cursor control device 614 coupled with the address/data bus 602, wherein the cursor control device 614 is configured to communicate user input information and/or command selections to the processor 600. In one aspect, the cursor control device 614 is implemented using a device such as a mouse, a track-ball, a track-pad, an optical tracking device, or a touch screen. The foregoing notwithstanding, in one aspect, the cursor control device 614 is directed and/or activated via input from the input device 612, such as in response to the use of special keys and key sequence commands associated with the input device 612. In an alternative aspect, the cursor control device 614 is configured to be directed or guided by voice commands.

In one aspect, the computer system 600 further may include one or more optional computer usable data storage devices, such as a storage device 616, coupled with the address/data bus 602. The storage device 616 is configured to store information and/or computer executable instructions. In one aspect, the storage device 616 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 618 is coupled with the address/data bus 602, wherein the display device 618 is configured to display video and/or graphics. In one aspect, the display device 618 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 600 presented herein is an example computing environment in accordance with one aspect. However, the non-limiting example of the computer system 600 is not strictly limited to being a computer system. For example, one aspect provides that the computer system 600 represents a type of data processing analysis that may be used in accordance with various aspects described herein. Moreover, other computing systems may also be implemented. Indeed, the spirit and scope of the present technology is not limited to any single data processing environment. Thus, in one aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, one aspect provides that one or more aspects of the present technology are implemented by utilizing one or more distributed computing environments, such as where tasks are performed by remote processing deices that are linked through a communications network, or such as where various program modules are located in both local and remote computer-storage media including memory-storage devices.

Figure 7:
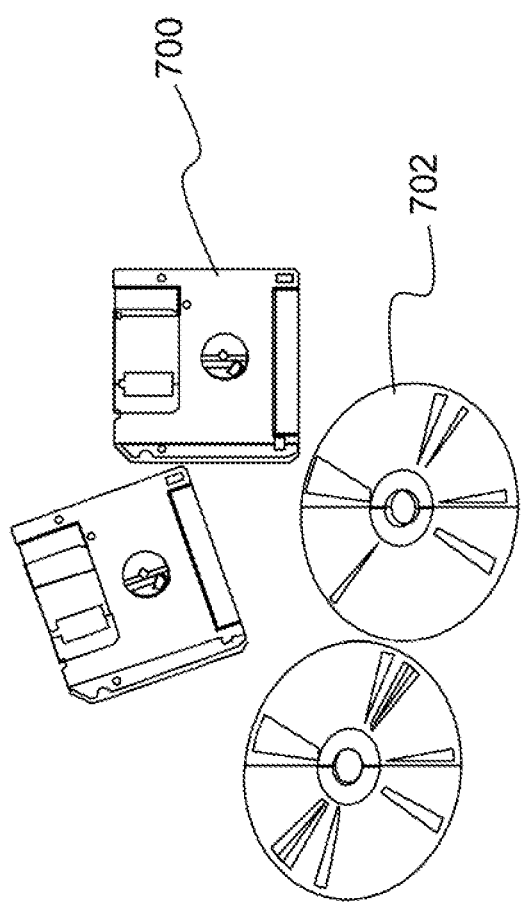
FIG. 7 is an illustration of a computer program product according to the present invention.

An illustrative diagram of a computer program product embodying the present invention is depicted in FIG. 7. As a non-limiting example, the computer program product is depicted as either a floppy disk 700 or an optical disk 702. However, as mentioned previously, the computer program product generally represents computer readable code (i.e., instruction means or instructions) stored on any compatible non-transitory computer readable medium.

What is claimed is:

1. A system for automated collaborative behavior analysis, the system comprising:
one or more processors and a non-transitory memory having instructions encoded thereon such that when the instructions are executed, the one or more processors perform operations of:
receiving a plurality of documents and a plurality of change log files of a collaborative media as input, wherein the plurality of documents are continuously edited by a plurality of authors, and wherein edits are recorded in the plurality of change log files;
identifying a type of editing behavior by authors of a given document in the plurality of documents;
analyzing edits made to the given document;
reporting how the authors interacted in a collaboration process, resulting in a set of reported author interactions;
identifying, from the set of reported author interactions, a set of identified author interactions that are most and least significant in the collaboration process;
estimating, based on the set of identified author interactions, future effects on documents of the collaborative media; and
representing the plurality of documents and the plurality of change log files as a temporal bipartite network, wherein the temporal bipartite network comprises a plurality of author type nodes, a plurality of page nodes, and a plurality of temporal edges annotating the time of the edits.

2. The system as set forth in claim 1, wherein the one or more processors further perform an operation of utilizing the plurality of change log files to annotate the plurality of author type nodes in the temporal bipartite network, wherein a node-colored temporal bipartite network is generated.

3. The system as set forth in claim 2, wherein the one or more processors further perform operations of:
classifying the edits into different types; and
annotating the plurality of temporal edges with classified edge types, wherein an edge-colored temporal bipartite network is generated.

4. The system as set forth in claim 3, wherein the one or more processors further perform an operation of extracting a set of author interactions into temporal motifs that represent collaborative behavior patterns.

5. The system as set forth in claim 4, wherein the one or more processors further perform an operation of quantifying a statistical significance of the temporal motifs.

6. A computer-implemented method for automated collaborative behavior analysis, comprising:
an act of causing a data processor to execute instructions stored on a non-transitory memory such that upon execution, the data processor performs operations of:
receiving a plurality of documents and a plurality of change log files of a collaborative media as input, wherein the plurality of documents are continuously edited by a plurality of authors, and wherein edits are recorded in the plurality of change log files;
identifying a type of editing behavior by authors of a given document in the plurality of documents;
analyzing edits made to the given document;
reporting how the authors interacted in a collaboration process, resulting in a set of reported author interactions;
identifying, from the set of reported author interactions, a set of identified author interactions that are most and least significant in the collaboration process;
estimating, based on the set of identified author interactions, future effects on documents of the collaborative media; and
representing the plurality of documents and the plurality of change log files as a temporal bipartite network, wherein the temporal bipartite network comprises a plurality of author type nodes, a plurality of page nodes, and a plurality of temporal edges annotating the time of the edits.

7. The method as set forth in claim 6, wherein the data processor further performs an operation of utilizing the plurality of change log files to annotate the plurality of author type nodes in the temporal bipartite network, wherein a node-colored temporal bipartite network is generated.

8. The method as set forth in claim 7, wherein the data processor further performs operations of:
classifying the edits into different types; and
annotating the plurality of temporal edges with classified edge types, wherein an edge-colored temporal bipartite network is generated.

9. The method as set forth in claim 8, wherein the data processor further performs an operation of extracting a set of author interactions into temporal motifs that represent collaborative behavior patterns.

10. The method as set forth in claim 9, wherein the data processor further performs an operation of quantifying a statistical significance of the temporal motifs.

11. A computer program product for automated collaborative behavior analysis, the computer program product comprising computer-readable instructions stored on a non-transitory computer-readable medium that are executable by a computer having a processor for causing the processor to perform operations of:
receiving a plurality of documents and a plurality of change log files of a collaborative media as input, wherein the plurality of documents are continuously edited by a plurality of authors, and wherein edits are recorded in the plurality of change log files;
identifying a type of editing behavior by authors of a given document in the plurality of documents;
analyzing edits made to the given document;
reporting how the authors interacted in a collaboration process, resulting in a set of reported author interactions;
identifying, from the set of reported author interactions, a set of identified author interactions that are most and least significant in the collaboration process;
estimating, based on the set of identified author interactions, future effects on documents of the collaborative media; and
representing the plurality of documents and the plurality of change log files as a temporal bipartite network, wherein the temporal bipartite network comprises a plurality of author type nodes, a plurality of page nodes, and a plurality of temporal edges annotating the time of the edits.

12. The computer program product as set forth in claim 11, further comprising instructions for causing the processor to perform an operation of utilizing the plurality of change log files to annotate the plurality of author type nodes in the temporal bipartite network, wherein a node-colored temporal bipartite network is generated.

13. The computer program product as set forth in claim 12, further comprising instructions for causing the processor to perform operations of:
  classifying the edits into different types; and
  annotating the plurality of temporal edges with classified edge types, wherein an edge-colored temporal bipartite network is generated.

14. The computer program product as set forth in claim 13, further comprising instructions for causing the processor to perform an operation of extracting a set of author interactions into temporal motifs that represent collaborative behavior patterns.

15. The computer program product as set forth in claim 14, further comprising instruction means for causing the processor to perform an operation of quantifying a statistical significance of the temporal motifs.

* * * * *